Jan. 14, 1930.  C. E. ELLIOTT ET AL  1,743,661
FRUIT JUICE EXTRACTOR
Filed Jan. 25, 1928  2 Sheets-Sheet 1

INVENTORS
Clarence E. Elliott
and Leonard O. Nichols
BY
ATTORNEY

Jan. 14, 1930.   C. E. ELLIOTT ET AL   1,743,661
FRUIT JUICE EXTRACTOR
Filed Jan. 25, 1928   2 Sheets-Sheet 2
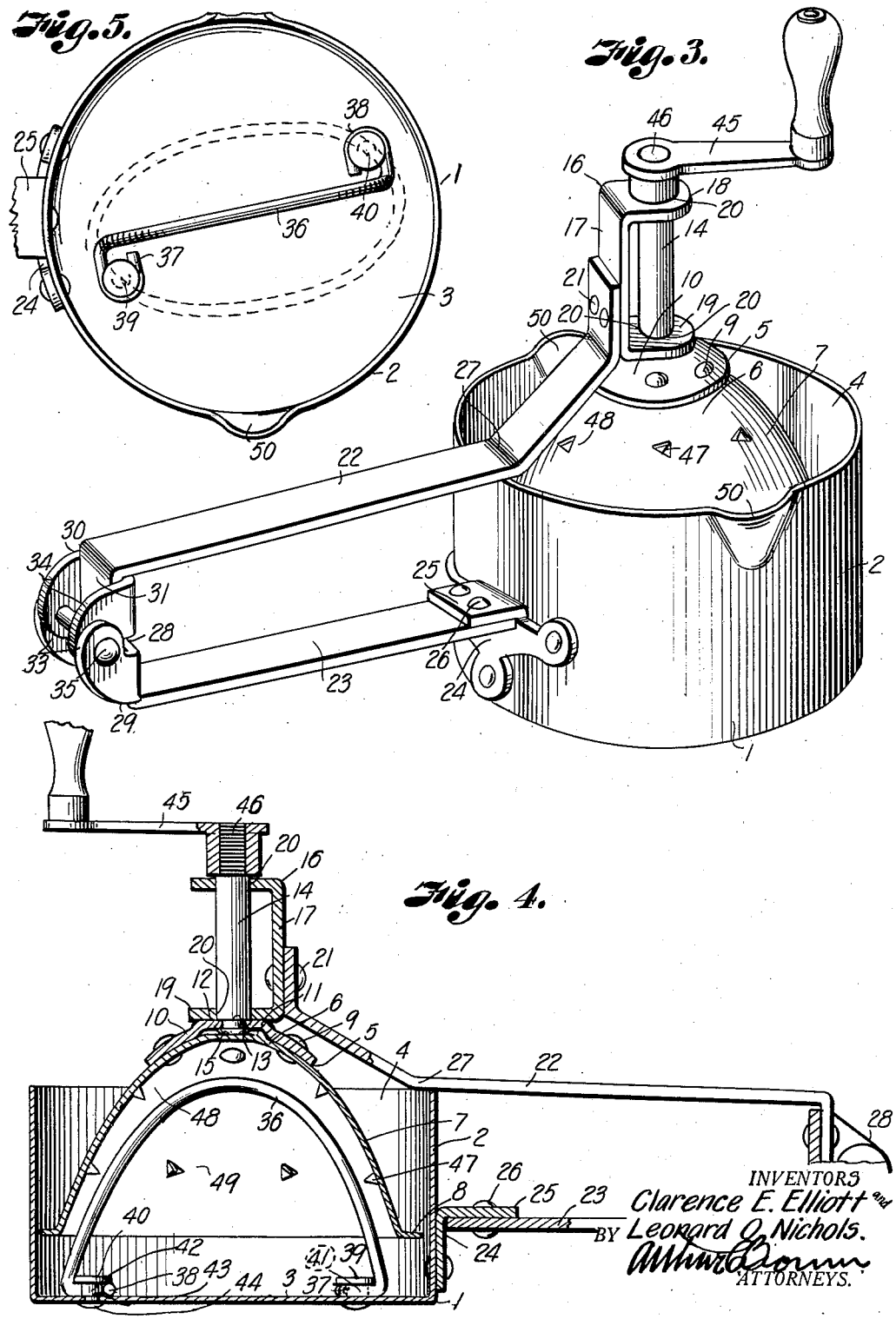
INVENTORS
Clarence E. Elliott and
Leonard O. Nichols
BY
ATTORNEYS.

Patented Jan. 14, 1930

1,743,661

UNITED STATES PATENT OFFICE

CLARENCE E. ELLIOTT AND LEONARD O. NICHOLS, OF KANSAS CITY, MISSOURI

FRUIT-JUICE EXTRACTOR  REISSUED

Application filed January 25, 1928. Serial No. 249,258.

Our invention relates to juice extractors and more particularly to a device for extracting the juices from oranges, lemons, citrus and other like fruits, and has for its principal object to provide for the complete extraction of such juices with facilities and extreme rapidity and to separate the seeds and pulp therefrom to obtain the juice in its purest quality.

Another important object of the invention to is provide a device inexpensive of manufacture in that the various parts may all be formed of die stampings and the parts readily assembled and secured together.

In accomplishing these and other objects of the invention we have provided improved details of structure, the preferred forms of which are illustrated in the accompanying drawings wherein:

Fig. 3 is a perspective view of the device in closed position after the juice has been extracted.

Fig. 4 is a longitudinal vertical sectional view through the same.

Fig. 5 is a plan view of the juice retaining receptacle.

Figure 1:
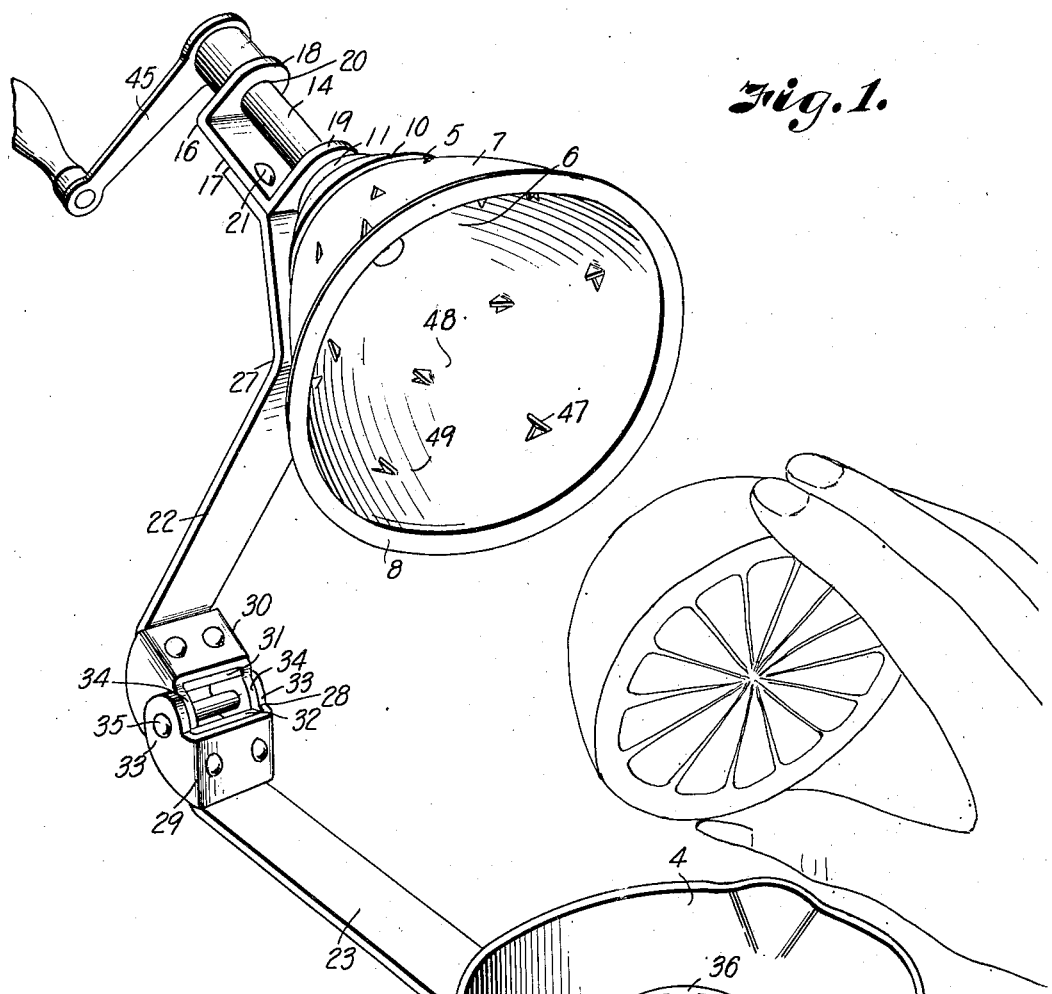
Fig. 1 is a perspective view of the preferred embodiment of our invention, illustrated in fruit-receiving position.
Figure 2:
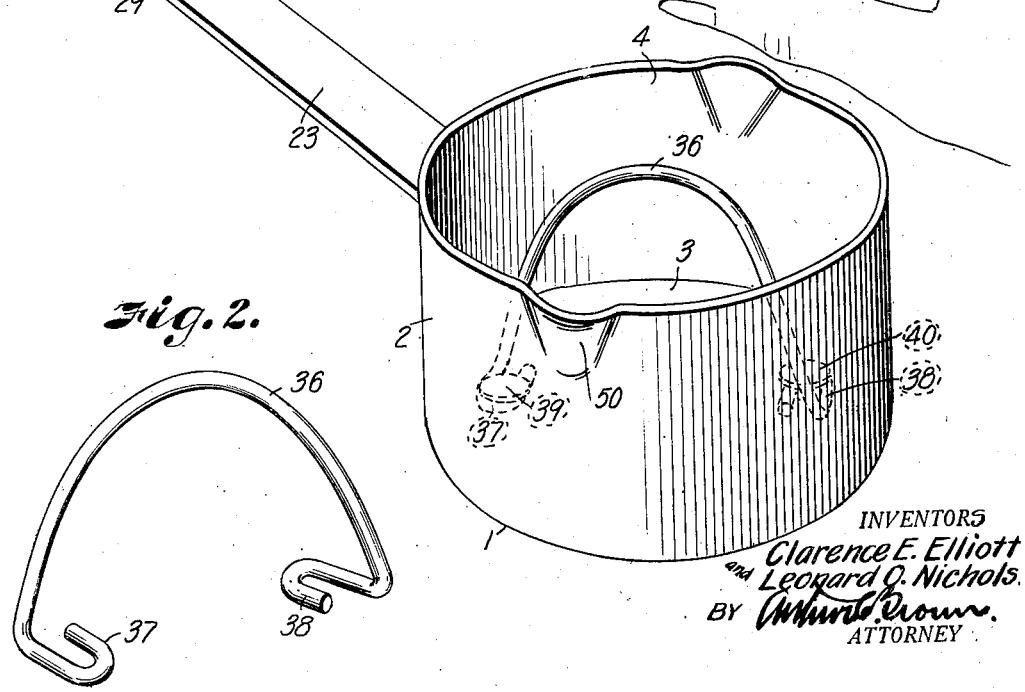
Fig. 2 is a detail perspective view of the pulp disintegrating element.

Referring more in detail to the drawings:

1 designates a juice receiving receptacle comprising a cup-shaped member formed of sheet metal and having a cylindrical wall 2, an integral flat bottom 3, and an open top 4 through which is projectable a fruit impaling member 5.

The impaling member is also constructed of sheet metal and comprises a cone-shaped cup having a rounded top 6 and an outwardly flaring side wall 7 terminating in a laterally projecting peripheral flange 8 of a diameter slightly smaller than the diameter of the juice receptacle so that the impaling member is readily receivable therein.

Fixed to the curved top of the impaling member by rivets 9 is a cap 10 having an upstruck boss or shouldered portion 11 provided with an opening 12 for receiving an end 13 of a shaft 14 which is riveted therein as at 15, the shaft being rotatably mounted in a yoke 16 comprising a bar 17 having laterally projecting ears 18 and 19 provided with apertures 20 for receiving the shaft.

Riveted to the yoke 16 by the rivets 21 is an arm 22 which, co-acting with a complementary arm 23 projecting laterally from the wall of the receptacle 1, forms a handle member for the device and means whereby the fruit is urged into engagement with a pulp engaging member hereinafter described, the arm 23 being secured to an ear member 24 riveted to the juice receptacle and having a laterally projecting ear 25 for attaching the end of the arm by fastening devices 26. The arm 22 projects downwardly toward the rim of the receptacle, as at 27, and then laterally thereof in substantially parallel alignment with the arm 23 so that the arms may provide means for pivotally attaching the fruit impaling member to the juice receptacle through a hinge element designated 28.

The hinge element 28 comprises a pair of yoke-shaped members 29 and 30 riveted to laterally bent ends 31 and 32 of the arms 23 and 22 respectively, each member having pairs of projecting ears 33 and 34 to receive a pintle 35 for hinging the members together and pivotally mounting the impaling member to the receptacle to permit the impaling member to be swung out of engagement with the receptacle for insertion of the fruit and then swung back to juice extracting position to urge the fruit into engagement with the pulp engaging member 36.

The juice extractor 36 comprises a semi-elliptic wire form of substantially the shape of the vertical cross section of the fruit impaling member. The wire presents a blunt edge to engage the juice containing cells of the fruit thus enabling the more effective extraction of the juice therefrom. This member has opposed laterally bent hook-shaped ends 37 and 38 for engaging the heads 39 and 40 of pins 41 and 42 that are secured to the bottom of the juice receptacle so that the wire form may be readily detached therefrom for cleaning purposes. The pins are provided with shouldered extensions 43 which project through openings 44 in the receptacle and are riveted to its under side to firmly secure the rivets in position for retaining the wire form 36.

In order to rotate the fruit retaining member 5, the shaft 14 is provided with a crank 45 threadedly secured to a reduced extension 46 of the shaft. It will thus be readily apparent that when the crank is screwed in position, the shaft is retained in the yoke but may be readily removed for cleaning purposes by unscrewing the crank and slipping the shaft therefrom.

In order to insure positive rotation of the fruit, the member 5 is provided with instruck V-shaped tangs 47 projecting forwardly in the direction of rotation so that the fruit is impaled thereby and positively rotated with the impaling member 5. We prefer to provide the impaling member with two or more rows of tangs 48 and 49 to insure engagement with the various sized fruits such as lemons, oranges and grapefruit within the capacity of the cone during the juice extracting operation.

In operating the device constructed as described, the impaling member 5 is swung on the hinge member 28, as shown in Fig. 1. The fruit is then cut into two parts and one of the portions inserted into the impaling member with the tangs 47 piercing the skin of the fruit. The impaling member is then lowered into engagement with the wire form 36 and while the left hand grips together the arms 22 and 23 of the handle member, the crank 44 is manipulated with the right hand, to rotate the fruit over the wire form. As the pulp gives way by rotation over the juice extractor, the impaling member is gradually and progressively lowered until the arm 22 engages the edge of the rim, whereupon all the juice is then extracted and ready to be removed for use.

The operator continues to grip the handle members 22 and 23 together and by tipping the device sidewise, the juice is poured from the spout 50 of the container into a glass or the like, and as the juice pours out, the seeds and loose pulp are retained by the impaling member, since, as before stated, its fit is fairly close within the receptacle to allow only the juice to escape, after which the skin, pulp and seeds may be removed. The juice from the other half of the fruit may then be removed in like manner.

Attention is particularly called to the fact that the juice extracting member is preferably wider than the fruit so that the skin is stretched along its plane thereby and as the skin is rotated thereover, the skin moves in an elongated curvilinear path about the form, as shown by the dotted lines in Fig. 5, and it is by this peculiar motion that the juice is so efficiently and easily removed. It will also be noted that the hooks on the juice extracting member are so positioned that the rotative movement of the fruit tends to keep them in engagement with the pins and that the impaling tangs are likewise positioned toward the direction of rotation so that the tangs easily pierce the skin as it is engaged and disengaged during its movement about the juice extractor.

From the foregoing it will be readily apparent that we have provided a device that is well adapted to the purpose for which it is intended and which will speedily and easily extract juices in a clean and sanitary condition, free from seed, pulp or other objectional matter.

What we claim and desire to secure by Letters Patent is:

1. In a fruit juice extractor, a juice receiving member, pins on the member, a wire loop engaging the pins for deforming the fruit pulp, a fruit impaling member rotatable over the wire loop, and a crank for rotating the said impaling member during the juice extracting operation.

2. In a fruit juice extractor, a juice receiving member, headed pins on the member, an extracting member comprising a wire loop having hooked ends for detachably engaging the headed pins, a fruit retaining member rotatable over the pulp disintegrator, and a crank for rotating the fruit retaining member.

3. A fruit juice extractor including a pair of hingedly connected arms, a conical fruit receptacle rotatably mounted on one of the arms and having a plurality of axially spaced series of impaling members on its inner surface inclined in direction of forward rotation of the receptacle for respectively engaging fruit of different sizes, a juice receptacle on the other arm, and a juice extracting member in the juice receptacle conforming in contour to the interior of the fruit receptacle.

4. In a fruit juice extractor, a juice receptacle, a downwardly divergent wire loop having its free ends removably anchored to the bottom of said receptacle, a fruit impaling member movable into said receptacle over the loop, and means for rotating the fruit impaling member.

5. In a fruit juice extractor, a juice receptacle having headed pins in its bottom, a downwardly divergent wire loop having hooks at its free ends removably engageable with the pins to anchor the loop in the receptacle, a fruit impaling member movable into said receptacle over the loop, and means for rotating the fruit impaling member.

6. In a fruit juice extractor, a juice receptacle, a rotatable fruit impaling member hingedly movable into the receptacle, headed pins in the bottom of the receptacle, and a wire loop having hooks on its free ends engageable with the pins in the direction of forward rotation of the impaling member for anchoring the loop in the receptacle.

7. A fruit juice extractor including a pair of arms, a juice receptacle on one of the arms including an extractor in the receptacle, a rotatable fruit receptacle on the other arm movable into and from the fruit receptacle over the extractor, and having an outwardly extending flange on its free edge interposed between the wall of the juice receptacle and said extractor when the parts are in closed relation to act as a retaining member for the seeds and pulp.

8. In a fruit juice extractor, a fruit carrying member, a juice extracting member lying substantially in a single plane of a greater diameter than the exposed portion of the fruit, for deforming the fruit from a circular to a non-circular shape, and means for moving the fruit carrying member relatively to the extracting member during the juice extracting operation.

9. In a fruit juice extractor, a revolvable holder for the fruit, a juice extracting member lying substantially in a single plane of a greater diameter than the exposed portion of the fruit for deforming the fruit from a circular to a non-circular shape and means for moving the fruit about said extracting member during the juice extracting operation.

10. In a fruit juice extractor, a carrying member for the fruit, a blunt juice extracting member lying substantially wholly in a plane, and means for relatively moving the carrying member and the extracting member during the juice extracting operation.

11. In a fruit juice extractor, a carrying member for the fruit, a juice extracting member lying substantially in a plane of greater diameter than the exposed portion of the fruit, means for moving the holder and extracting member towards each other to deform progressively the fruit over the extracting member, and means for relatively rotating the carrying member and the extracting member during the juice extracting operation.

12. A fruit juice extractor comprising a juice receiving cup, a juice extracting member lying substantially in a vertical plane within the cup, a fruit receiving member, means for holding the fruit within the last named member, and means for relatively rotating the receiving member over the extracting member during the juice extracting operation.

13. The method of extracting the juice from citrous fruit which consists in exposing the portion to be treated and applying a force substantially along a plane while relatively moving the fruit about the plane of action to deform the fruit from a circular to a non-circular shape.

14. In a fruit juice extractor a fruit carrying member having a plurality of axially spaced impaling members on its working surface inclined in the direction of forward rotation to engage the fruit during the juice extracting operation.

15. The method of extracting the juice from citrous fruit which consists in exposing the portion to be treated and applying a force substantially along a plane and normal to said exposed portion while relatively moving the fruit about the plane of action to stretch progressively and increasingly the fruit along the plane of action.

16. An article of manufacture, a fruit juice extractor consisting of a blunt arcuate member whose thickness is less than the length or breadth.

17. An article of manufacture, a fruit juice extractor consisting of a single downwardly divergent wire loop.

In testimony whereof we affix our signatures.

CLARENCE E. ELLIOTT.
LEONARD O. NICHOLS.